United States Patent [19]

Brokenshire et al.

[11] 3,961,185
[45] June 1, 1976

[54] FIBER OPTIC DISPLACEMENT TRANSDUCER

[75] Inventors: Robert E. Brokenshire, Troy; Robert G. Pratt, Farmington Hills, both of Mich.

[73] Assignee: The Detroit Edison Company, Detroit, Mich.

[22] Filed: Nov. 11, 1974

[21] Appl. No.: 522,418

[52] U.S. Cl. ............................ 250/231 R; 73/517 R; 250/227
[51] Int. Cl.² .......................................... G01D 5/34
[58] Field of Search ............ 73/71, 71.1, 71.2, 71.3, 73/516 R, 517 R, 517 B; 250/231 R, 227, 234; 350/16

[56] References Cited
UNITED STATES PATENTS

| | | | |
|---|---|---|---|
| 2,447,863 | 8/1948 | Kent et al. ...................... | 250/231 X |
| 2,498,997 | 2/1950 | McLean et al. .................. | 250/231 X |
| 3,224,279 | 12/1965 | Galli et al. ...................... | 250/227 X |
| 3,335,367 | 8/1967 | Skooglund et al. .............. | 250/227 X |
| 3,394,976 | 7/1968 | Hawkins ........................... | 250/227 |
| 3,407,305 | 10/1968 | Sterry .............................. | 73/71.3 X |
| 3,789,674 | 2/1974 | Anderson et al.................. | 73/517 R |

*Primary Examiner*—Walter Stolwein
*Attorney, Agent, or Firm*—Whittemore, Hulbert & Belknap

[57] ABSTRACT

Apparatus for measuring displacement between two bodies one of which is provided with a light reflecting target area having a sharply delineated boundary. The other body has two fiber optic bundles one of which has a light emitting end adjacent the boundary of the light reflecting target area. The other bundle has a light receiving end adjacent the light reflecting area adapted to receive light reflected from the area. The arrangement permits use of the transducer in a hazardous or inconveniently accessible area with an output which may be located remote from the body.

25 Claims, 2 Drawing Figures

FIBER OPTIC DISPLACEMENT TRANSDUCER

BRIEF SUMMARY OF THE INVENTION

The present invention broadly provides means for measuring relative movement or displacement between two bodies and includes fiber optic bundles having input and output ends which may be remote from the bodies. This permits use of the transducer for measuring the relative movement in hazardous areas such for example as areas where temperature, electrical, magnetic, or other environmental conditions makes access hazardous or at least inconvenient. An example of a usage of this type is for measuring generator core and end-turn vibration of on-line electrical generators. In general, the equipment has value for obtaining information as to vibration or otherwise induced relative movement in hazardous environments such as large electrical machines where conducting paths to ground and injury to personnel are potential hazards with hard wired systems.

The present invention in general measures magnitude and/or frequency of movement between two bodies. Examples of the foregoing include measurement of vibration in which one of the bodies is a low tuned seismic element. A second application of the invention is to measure temperature via displacement of a bimetallic element for example. A further application is in measuring fluid pressure via measurement of deflection of a diaphragm or bourdon tube. It is also useful in measuring force via relative deflection between two bodies one of which deflects in accordance with applied force. Magnetic field intensity may be measured via deflection of a magnetic light reflecting element within the field. Static electric field intensity may be measured via the deflection of two gold leaves occurring because of mutual repulsion. Fluid flow velocity may be measured via the deflection of a read type element inserted in the flow stream. Other applications will be readily apparent.

In the present state of the art, fiber optic bundles of relatively great length, as for example several hundred feet, may be used to conduct light with insignificant loss. It is thus possible to obtain measurement of relative movement between two bodies located in a hazardous area at a remote station by conducting light through one fiber bundle to the hazardous area, and receiving reflected light through the other bundle at the remote location, where the variable light output is directed to a light sensing means where the variable light output is converted to an electrical signal as for example a voltage variable in magnitude in accordance with the amount of relative displacement of the bodies and having a frequency dependent upon the frequency of relative movement, where such movement is vibratory or oscillatory in nature.

At the station where the relative movement is to be sensed there are provided two relatively movable bodies, one of which has a light reflecting target area provided with one or more sharply delineated boundaries. One of the fiber optic bundles has a light emitting end adjacent the light reflecting area such that light emitted therefrom falls partly in the light reflecting area and partly outside the area across the sharply delineated boundary. A light source at the remote station directs light into the end of the first bundle at the remote station. A second fiber optic bundle is provided having a light receiving end adjacent the light reflecting target area on the first mentioned body. The ends of both fiber bundles are fixedly mounted on the second body so as relative movement between the bodies occurs, the amount of light emitted from the first bundle and falling on the target area varies in accordance with the magnitude of the movement. The sharply delineated boundary of the target area is preferably but not necessarily perpendicular to the direction of relative movement.

The light falling upon the target area from the first bundle is reflected and enters the light receiving end of the second bundle which conveys it to the remote station.

At the remote station the light from the second bundle is caused to fall upon a light sensing means such for example as a light sensitive cell, where the output is converted to an electrical output, conveniently, a voltage variable in accordance with the amount of light falling upon the cell. Where the relative motion between the bodies is vibratory in nature, this voltage output will of course exhibit a frequency characteristic in accordance with the frequency of vibration.

BRIEF DESCRIPTION OF THE DRAWING

FIG. 12 is a fragmentary sectional view on the line 2—2, of FIG. 1.

DETAILED DESCRIPTION

Figure 2:
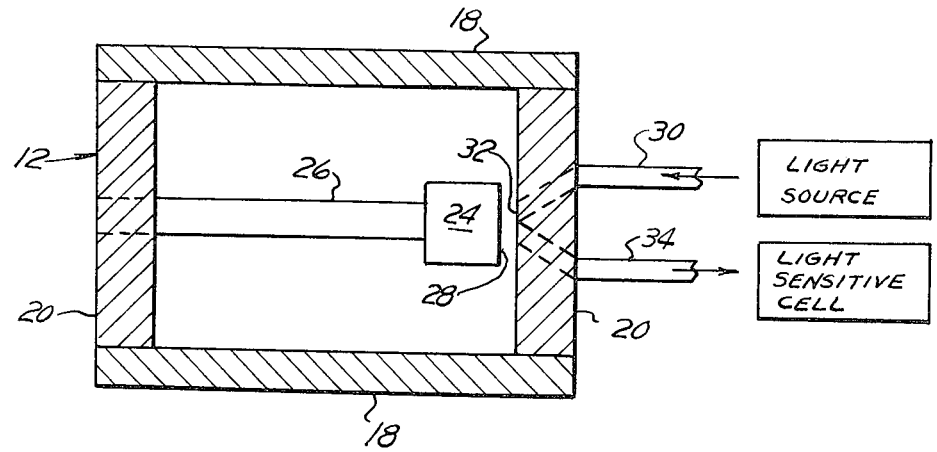

Referring now to the drawings, there is illustrated a simplified construction in which the present invention is applied for the purpose of measuring relative movement between two bodies, such as that resulting from vibration of one of the bodies.

Figure 1:
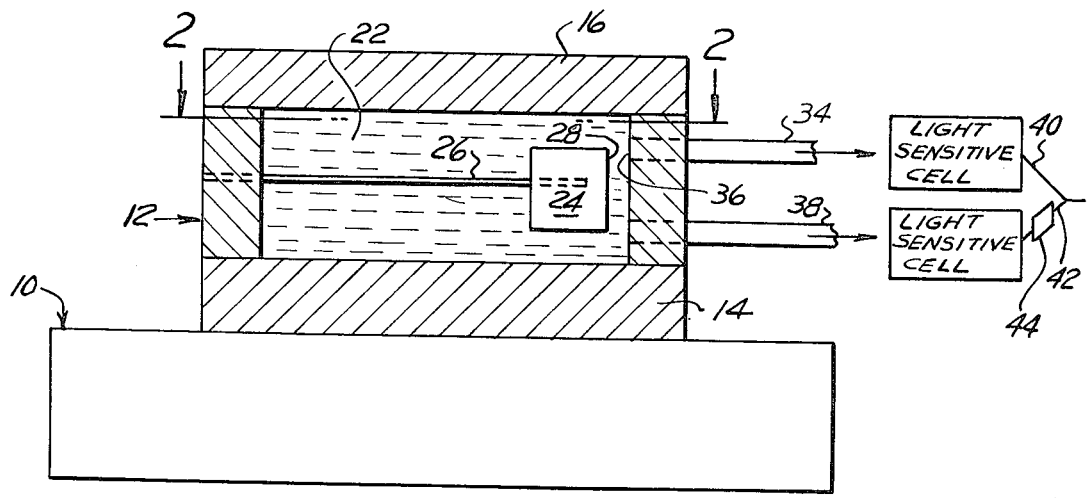
FIG. 1 is an elevational view, partly in section, through a preferred embodiment of the present invention.

In FIG. 1 the article where vibration is to be measured as indicated at 10, and for purposes of illustration, may be assumed to be a component of a large electrical generator. The transducer comprises a closed case 12 having a bottom wall 14, a top wall 16, side walls 18, and end walls 20. Preferably, the case 12 is sealed and contains a fluid indicated by the broken lines 22 for the purpose of dampening movement of a body within the case.

The case 12 itself constitutes one of the aforesaid bodies and undergoes vertical movement in accordance with the vertical component of vibration of the article 10. The other body is a seismically supported mass 24 which is here indicated as supported by a cantilever leaf spring 26. The natural or resonant frequency of the mass 24 and spring 26 is designed to be no greater than approximately ¼ of the minimum frequency to be measured. Under these conditions, while the case 12 will vibrate vertically with the adjacent surface of the article 10, the seismically supported mass 24 will remain relatively stationary in a position determined by the mean of the upper and lower limits of movemeent of the case 12.

The mass 24 is provided with a light reflecting surface having a sharply delineated boundary or edge. In the present case the entire surface 28 of the mass 24 may be considered as a reflecting surface and its sharply defined edges are of course the upper and lower edges of the surface 28.

A first fiber optic bundle 30 is provided which extends from a remote area and has a light emitting end adjacent the reflecting surface 28. The surface 28 may be specularly reflecting or not, but for maximum effect it is preferred that the surface be specular. The light emitting end 32 of the bundle 30 is herein illustrated as adjacent a horizontal edge of the reflecting surface 28 such that approximately half of the light emitted from the end 32 of the bundle falls upon the reflecting surface 28. Thus, as the case 12 moves vertically from an intermediate position, the amount of light falling upon the reflecting surface 28 decreases as the case moves upwardly, and increases as the case moves downwardly, or vice versa, depending on whether the bundle end 32 is adjacent the lower or upper edge of surface 28.

A second fiber optic bundle 34 is provided which extends from the remote area through the case wall 20 and has a light receiving end 36 adjacent the reflecting surface 28 such that the light emitted from the end 32 of the bundle 30 which falls upon the reflecting surface 28 is thus reflected into the bundle 34.

At the remote station a light source, as indicated in the legend, is provided adjacent the end of the bundle 30 and directs light at a constant rate into the bundle 30. At the remote station the light reflected back through the bundle 34 is caused to fall upon light sensing means such for example as the light sensitive cell identified in the legends in FIGS. 1 and 2. This light sensitive means may be a photoconductive cell, a photovoltaic cell, a photodiode, a phototransistor, or the like, and is effective to convert the integrated light intensity from the light receiving probe into an analogous electrical voltage.

The case 12 may be constructed of any suitable material and will be selected in accordance with the environment in which it is to operate. Thus, for example, it may be made to withstand chemical, physical, electrical, and magnetic characteristics of the environment.

While in the foregoing, for simplicity, it was indicated that the entire surface 28 of the mass 24 would be considered as specularly reflecting, it may be mentioned that the target areas may simply be a white target on a black background or the sharp edge of a specularly reflecting area located on an light absorbing surface.

The fiber optic bundles or light guides are non-coherent. Non-coherent fiber optic bundles or light guides are those in which the arrangement of individual fibers is random, and the location of individual fiber ends relative to the area occupied by fiber ends at opposite ends of the bundle need not be the same. Coherent bundles may transmit images but are difficult and expensive to produce. The present invention makes use of relatively simple and inexpensive non-coherent bundles. The emitting and receiving ends of the fiber optic bundles can be of virtually any shape depending on the desired relationship of output voltage to vibration amplitude. For example, if the ends are rectangular, the received light will be a linear function of vibration amplitude over the width of the possible amplitude range. Since the bundles are non-coherent, there is no difficulty in converting the normally round cross-section bundle to a different cross-section where its end is exposed adjacent the reflecting surface 28.

The light source which directs light into the bundle 30 is preferably a high intensity light source which may be powered either with a DC voltage or an AC source with a frequency at least several times higher than the highest frequency to be measured.

In operation the transducer case 12 is firmly attached to the structure 10 whose vibration is to be measured. The means of attachment must of course be sufficiently rigid to insure that the case exactly follows movement of the structure in vibration. Under vibratory motion of the structure or article 10, the case 12 follows the vibratory motion, but the inertial reference mass 24 remains relatively stationary in space, thus producing a relative motion between the case and mass equal to the motion of the structure.

The relative motion is converted to an electrical signal. As the sharp edge of the reflecting area 28 moves in front of the optic probes, it modulates the amount of light to the receiver probe in direct proportion to the position of the mass 24 relative to case 12. That is, the proportion of the light input energy which is reflected to the output optic probe at any instance is a function of the reflecting target relative to the probes. Under static or no vibration conditions, the transducer preferably is designed such that one-half of the input energy is reflected by positioning the reflecting target to cover one-half of the exit end 32 of the fiber optic probe or bundle 30. The light reflected then increases or decreases as the reflecting target covers more or less of the probe openings.

A transducer constructed in accordance with the foregoing has a demonstrated electrical output on the order of 100 mV per 0.001 inch peak-to-peak of vibration at 120 Hz. This transducer was designed for use in the high magnetic and electric fields which exist in a generator, and for this purpose the transducer case was constructed of Bakelite which is electrically non-conducting and impervious to magnetic fields. The seismic mass or body 24 was formed of non-magnetic stainless steel. The fiber optic bundle and jacketing were non-conducting plastic or glass. Under test, a six inch sample withstood a 50 kV voltage differential for over a minute with no breakdown.

A transducer built for a different environment could of course be constructed of different materials consistent with the environmental needs. There is far more flexibility in selection of materials for this transducer than for others available.

Referring again to the drawing, in FIG. 1 it will be noted that there is a further pair of input and output fiber optic bundles of which the lower optic bundle receiving light from the surface 28 is designated 38. The lower pair of fiber optic bundles operate in precisely the same way as the upper pair except that they cooperate with the lower edge of the surface 28. With this arrangement, two specifically different advantages can be realized over a single fiber optic pair system.

In the first place, the outputs from the light sensors at the ends of the receiving bundles may be added electrically as indicated by lines 40 and 42, to measure the illuminating lamp intensity as seen through the fiber optic bundles and the reflecting surface 28. This permits use of an amplifier system to adjust its gain in order to correct for changes in lamp intensity, fiber optic light transmission, reflectivity of the surface 28, and transmissivity of the dampening fluid 22.

A second advantage is that the output of one of the light sensors can be reversed as indicated diagrammatically by the reference character 44 which indicates means for reversing the output of the signal of the lower light sensitive cell. This will tend to linearize the overall output signal from the transducer.

It has been mentioned in the foregoing that by employing a rectangular, and preferably square, or a round cross-section cantilever support, vibration of a seismic mass may be measured in two directions. Thus, vibrational components at right angles to each other may be determined. As an extension of the foregoing, it will be apparent that up to six modes of sensitivity (three translational and three rotational) may be provided in a transducer using the same principles outlined in the foregoing.

Referring again to the drawings, it will be observed that the reflecting surface 28 (assuming that the body 24 is cubical as illustrated) has a top horizontal edge which provides a sharply delineated boundary. The direction of relative movement between the light emitting and receiving ends of the bundles 30 and 34 on the one hand, and the reflecting surface 28 on the other is substantially vertical. As seen in FIG. 2 the arrangement is such that all of the light emitted from the bundle 30 and falling upon the surface 28 is reflected into the bundle 34. As seen in FIG. 1, the upper edge of the reflecting surface 28 lies approximately between the upper and lower edges of the light emitting end 32 and similarly, midway between the upper and lower edges of the light receiving surface 36. Accordingly, in the null or intermediate position illustrated in FIG. 1, substantially half of the light transmitted into the bundle 30 is reflected into the bundle 34. With this arrangement it is of course apparent that substantially half of the light emitted in a beam from the surface 32 of the bundle 30 is reflected into a beam substantially all of which is transmitted to the end 36 of the bundle 34. Accordingly, as the body 24 moves upwardly more light is transmitted into the bundle 34, and as the body 24 moves downwardly, less light is transmitted into the bundle 34.

The transducer constructed in accordance with the foregoing disclosure exhibits the following advantages over transducers available today designed for equivalent usage:

1. The transducer, for all practical purposes, is totally electrically isolated from the light supply, light intensity to voltage converter, and associated electronics.
2. The fiber optic leads can pass through high intensity electric or magnetic fields without picking up electrical noise.
3. The transducers can be used safely in potentially explosive environments because of the absence of electrical leads and electrical power.
4. The nature of the transducer and its relatively high electrical output minimizes the need for additional electronic signal conditioning as compared to transducers utilizing strain gauges.
5. The high electrical isolation between the sensor and readout instrumentation provides greater operator safety than conventional systems utilizing lead wires.
6. It is not necessary to use coherent fiber optic bundles since the output is dependent on the total or integrated light transmitted in wall wave guides rather than the relative light transmitted in each wave guide. The use of non-coherent fiber optic bundles represents a significant cost reduction over the use of coherent bundles which are used for image transmission.

What we claim as our invention is:

1. A fiber optic vibration displacement transducer for use in a hazardous area comprising a support, a body, seismically isolating means mounting said body on said support for movement relative thereto, said seismically isolating means being effective to provide for vibratory movement of said support while preventing movement of said body to provide relative movement between said support and body substantially equal in magnitude and frequency to vibratory movement of said support, a light reflecting target surface on said body, a first non-coherent fiber optic bundle fixedly mounted on said support for vibratory movement therewith and having a light emitting end adjacent and confronting at least a part of said reflecting surface, a second non-coherent fiber optic bundle also fixedly mounted on said support for vibratory movement therewith and having a light receiving end positioned adjacent the light emitting end of said first bundle, and adjacent and confronting at least a part of said reflecting surface to receive from said surface an amount of reflected light variable in accordance with the position of said target surface relative to said bundle ends, a light source for directing light into said first bundle, and light sensing means positioned to receive light from said second bundle and to produce a signal indicative of a characteristic of the vibration.

2. A transducer as defined in claim 1 in which the seismically isolating means comprises spring means which with said body has a resonant frequency no greater than about ¼ of the minimum frequency to be measured.

3. A transducer as defined in claim 2 in which said spring means comprises a cantilever spring having a cross-sectional shape effective to provide for vibration sensing in directions at right angles to each other.

4. A transducer as defined in claim 1 in which said target surface has a sharply delineated boundary edge generally perpendicular to the direction of the vibration component to be measured, and in which during measurement of vibration, the location of the ends of said bundles are such that movement of said boundary edge relative to the path of light from said first bundle to said second bundle varies the quantity of light transmitted through said second bundle.

5. A transducer as defined in claim 4 in which said sharply delineated boundary edge of said target area is constituted by an edge of the surface of said body adjacent said bundles.

6. A transducer as defined in claim 5 in which in the static condition of said body, said target is positioned to receive about one-half of the output of said first bundle and to reflect it to said second bundle.

7. A transducer as defined in claim 1 in which the light emitting and/or receiving ends of said bundles adjacent said body are of a cross-section to produce the desired weighted relationship of output light intensity to relative displacement.

8. A transducer as defined in claim 4, comprising a second pair of fiber optic bundles, light source and light sensing means are fixedly mounted on said support in the relationship defined in claim 1, in association with a second sharply delineated boundary of said reflecting target area generally parallel to said first boundary.

9. A transducer as defined in claim 8 which comprises means for electrically adding the outputs of both of said bundles which transmit light to said sensing means.

10. A transducer as defined in claim 8 in which the phase of one of said light sensing means is reversed, and the signal output thereof is electrically added to the output of the other sensing means.

11. Apparatus for measuring relative movement between two bodies having mounting means providing for relative vibratory movement between said bodies which comprises a light reflecting area on one body having a sharply delineated boundary, a first non-coherent fiber optic bundle fixedly mounted on the other of said bodies and having a light emitting end adjacent and confronting said area in position to emit part only of the light therefrom onto said surface, a light source remote from said bodies directing light into the other end of said bundle, a second non-coherent fiber optic bundle fixedly mounted on said other body and having a light receiving end adjacent and confronting said area to receive light reflected therefrom and having a light emitting end remote from said bodies, light sensing means in position to receive light from said second bundle, the amount of light received at any instant by said sensing means being a function of the relative instantaneous position of said bodies.

12. Apparatus as defined in claim 11 in which said sharply delineated boundary extends generally perpendicular to the direction of relative movement between said bodies.

13. Apparatus as defined in claim 11 in which the ends of said bundles adjacent the said reflecting area are of rectangular cross-section.

14. Apparatus as defined in claim 13 in which opposite sides of the rectangular ends of said bundles are generally perpendicular to the direction of relative motion between said bodies.

15. A transducer as defined in claim 1 in which said vibration characteristic is the magnitude thereof.

16. A transducer as defined in claim 1 in which said vibration characteristic is the frequency thereof.

17. A transducer as defined in claim 1 in which said vibration characteristic is the magnitude and frequency thereof.

18. A transducer as defined in claim 3 in which said spring is of circular cross-section.

19. A transducer as defined in claim 3 in which said spring is of rectangular cross-section.

20. A transducer as defined in claim 4 in which the relative motion between the light reflecting target surface of said body and the light emitting and receiving ends of said bundles is such as to cause said boundary edge to move transversely of the path of light from the first bundle to the second bundle.

21. Apparatus for measuring relative movement between a first and second body, said first body having a first non-coherent fiber optic bundle having a light emitting end occupying a first area of a surface of said first body, means for projecting light into all of the fibers at the opposite end of said bundle to project a first beam of light from the light emitting end of said first bundle, said second body having a light reflecting surface positioned to intercept at least a part of said beam and to reflect the intercepted light into a second beam, said first body having a second non-coherent fiber optic bundle having a light receiving end occupying a second area of said surface adjacent said first area and positioned to receive at least a part of said second beam, light sensing means at the other end of said second bundle positioned to receive simultaneously all of the light received at the light receiving end of said second bundle, and mounting means for said bodies providing for vibratory movement of one of said bodies relative to the other body in a direction generally transverse to one of said beams.

22. Apparatus as defined in claim 21 in which said first and second areas occupy a first plane, said light reflecting surface of said second body occupies a second plane generally parallel to and spaced from said first plane, and in which the direction of said relative movement is generally parallel to said planes.

23. Apparatus as defined in claim 22 in which the ends of said bundles adjacent said reflecting surface are angularly disposed such that said beams are respectively parallel to the portions of the fibers from which they are emitted and by which they are received.

24. Apparatus as defined in claim 22, said reflecting area having a sharply delineated boundary extending transversely of the direction of said relative movement.

25. Apparatus as defined in claim 22, said reflecting area having a sharply delineated bounding extending generally perpendicular to the direction of said relative movement.

* * * * *